United States Patent
Kurosaki

Patent Number: 6,085,483
Date of Patent: Jul. 11, 2000

[54] TRIM ASSEMBLY FOR VEHICLE AND METHOD FOR MANUFACTURING THE SAME

[75] Inventor: Hideyuki Kurosaki, Shioya-gun, Japan

[73] Assignee: TS Tech Co., Ltd., Asaka, Japan

[21] Appl. No.: 09/166,098

[22] Filed: Oct. 5, 1998

[30] Foreign Application Priority Data

May 29, 1998 [JP] Japan .................................. 10-149978

[51] Int. Cl.$^7$ ........................................................ E04C 2/34
[52] U.S. Cl. ................... 52/716.5; 52/716.7; 52/716.1; 52/718.06; 52/717.04; 296/146.7
[58] Field of Search ........................... 52/716.5, 716.6, 52/716.7, 716.8, 716.1, 718.01, 718.06, 718.03, 717.04, 287.1; 296/207, 146.7; 112/440, 441

[56] References Cited

U.S. PATENT DOCUMENTS

| | | |
|---|---|---|
| 1,675,998 | 7/1928 | Walters . |
| 1,904,543 | 4/1933 | Schemmel ........................... 112/441 X |
| 1,929,590 | 10/1933 | Krentler . |
| 2,458,588 | 1/1949 | Gordon et al. ....................... 112/440 X |
| 2,576,121 | 11/1951 | Kamborian . |
| 3,110,069 | 11/1963 | Jones ................................... 52/716.6 X |
| 4,039,215 | 8/1977 | Minhinnick ............................ 293/142 |
| 4,201,359 | 5/1980 | Baslow ................................. 52/716.1 X |
| 4,801,479 | 1/1989 | Fielder et al. ....................... 52/716.5 X |
| 4,911,959 | 3/1990 | Miyakawa ........................... 52/716.5 X |
| 5,195,793 | 3/1993 | Maki .................................... 52/716.7 X |
| 5,399,393 | 3/1995 | Zoller .................................. 52/716.5 X |
| 5,552,195 | 9/1996 | Cook et al. ......................... 52/716.5 X |

FOREIGN PATENT DOCUMENTS

| | | |
|---|---|---|
| 135473 | 11/1949 | Australia .............................. 52/716.5 |
| 0 543 066 A1 | 5/1993 | European Pat. Off. . |
| 387420 | 1/1924 | Germany . |
| 1039355 | 9/1958 | Germany . |

*Primary Examiner*—Beth A. Stephan
*Assistant Examiner*—Brian E. Glessner
*Attorney, Agent, or Firm*—Oliff & Berridge, PLC

[57] ABSTRACT

A trim assembly for a vehicle that has gathers approximately paralleling each other. The trim assembly for a vehicle has a top cover, a plate-like base member and a cushion member inserted between the plate-like base member and the top cover. The top cover has a gather-sewing peripheral portion having, when the trim assembly is unfolded, an edge having a stairs-like shape having the first and second oblique portions and an approximately straight portion. The plate-like base member has an edge having, when the trim assembly is unfolded, a stair-like shape having an oblique portion and an approximately straight portion. The trim assembly for a vehicle has a structure that edges of the top cover and plate-like base member are turned back together onto and fastened to the plate-like base member to make a smooth edge line.

13 Claims, 10 Drawing Sheets

RELATED ART

*RELATED ART*

TRIM ASSEMBLY FOR VEHICLE AND METHOD FOR MANUFACTURING THE SAME

BACKGROUND OF THE INVENTION

1. Field of the Invention

The present invention relates to a trim assembly for a vehicle, which has a gathered top cover made of a natural leather or the like and a method for manufacturing the same.

2. Description of Related Art

In a door lining or trim panel for a vehicle, a trim assembly (pad) having a gathered top cover made of natural leather or the like to improve luxurious feeling for aesthetic appearance has been known.

FIGS. 12A and 12B show a trim assembly (pad) having a gathered top cover according to an example of an earlier technology. FIG. 12A is a front view of the trim assembly which is illustrated from a room side, and FIG. 12B is a rear view of the trim assembly which is illustrated from a body side. The earlier trim assembly (pad) 90 for a door lining or trim panel for a vehicle is manufactured by gather-sewing peripheral portions of a top cover 91, turning back the peripheral portions of the top cover 91 to the body side surface of peripheral portions of one-piece cardboard or pasteboard 92 to which polyurethane foam which is for a cushion member and not shown is fastened so as to wrap the peripheral portions of the cardboard or pasteboard 92, and sewing the peripheral portions of the top cover 91 on the peripheral portions of the cardboard or pasteboard 92 to form sewing portion 93.

As the result, the trim assembly (pad) 90 for a door lining or trim panel for a vehicle can be formed, comprising an upper peripheral portion 95 having an approximately continuous arc shaped edge line extending from a tapered front portion 94 to a rear side; a lower peripheral portion 96 having an approximately continuous arc shaped edge line extending from a tapered front portion 94 to a rear side; and a rear peripheral portion 97 which connects the rear end, of the upper peripheral portion 95 and the lower peripheral portion 96.

However, there is problem in above described earlier trim assembly for a door lining or trim panel for a vehicle.

In such the trim assembly 90 for a door lining or trim panel for a vehicle, having tapered shaped portion, in particular, a front of center of the bottom peripheral portion 96 is curved to have a sloped peripheral portion 96b extending to connect the tapered front portion 94, while a rear of center of the bottom peripheral portion 96 has straight shape to be approximately straight shaped portion 96a extending to connect the rear peripheral portion 97. Therefore, there is a problem that on an upper portion of the approximately straight shaped portion 96a extending to connect the rear peripheral portion 97, lengthwise gathers 98 are formed in parallel to each other on the top cover 91, while on an upper portion of the sloped peripheral portion 96b extending to a side of the tapered front portion 94, oblique gathers 99 are formed on the top cover 91.

SUMMARY OF THE INVENTION

The present invention has been developed in view of the problem.

An object of the present invention is to provide a trim assembly for a vehicle, which has a top cover having gathers in parallel to each other even if the trim assembly for a vehicle also has a tapered shaped portion.

Another object of the present invention is to provide a method for manufacturing the same.

In order to accomplish the above objects, in accordance with one aspect of the invention, a trim assembly for a vehicle, which has a tapered shaped front portion, upper and lower peripheral portions, which have approximately continuous smooth edge lines extending from the tapered shaped front portion toward a rear side in upper and lower sides, respectively, and a rear peripheral portion which connects the rear ends of the upper and lower peripheral portions, the trim assembly for a vehicle comprises: a top cover comprising a gather-sewn peripheral portion; a plate-like base member, to which the peripheral portion of the top cover is sewn on a peripheral portion of the base member; and a cushion member inserted between the plate-like base member and the top cover; wherein each lower peripheral portion, of the top cover and the base member, the peripheral portions of which have been sewn to each other comprises an approximately straight shaped portion extending from the rear side to a portion near tapered shaped front portion, and being approximately in parallel with a rear of center of the upper peripheral portion, in a development state, and then the lower peripheral portions, of the top cover and the base member are turned back onto and fastened to the base member to make the approximately continuous smooth edge line extending from the tapered shaped front portion to the rear side.

The trim assembly can be used for a door lining assembly (pad) or a trim panel assembly (pad) for a door panel of avehicle. The trim assembly also can be used for a side lining assembly (pad) for a body side molding, and the like.

In particular, the top cover can comprise natural leather formed from a cowhide, horse hide or other animal hide. It can be also used artificial leather, cloth made of fibers, or the like therefor.

The plate-like base member can comprise cardboard or pasteboard. Thin resin, comparatively rigid resin, and the like can be also used therefor.

As described above, according to the trim assembly, because each lower peripheral portion, of the top cover and the base member, the peripheral portions of which have been sewn to each other comprises an approximately straight shaped portion extending from the rear side to the portion near tapered shaped front portion, and being approximately in parallel with the rear of center of the upper peripheral portion, in a development state, it is possible to form the gathers in approximately parallel with each other.

The approximately continuous smooth edge line can have an approximate arc shape, and the lower peripheral portions of the top cover and the base member in the development state can be turned back onto and fastened to a body side surface of the base member to make the approximately continuous smooth edge line. Therefore, it is possible to make the trim assemble stylish.

The cushion member can comprise a plate-like attachment base for securing the trim assembly to a body of the vehicle, a cushion material fastened to the attachment base, and a slippery layer which makes the top cover easy to slip on a surface of the cushion material.

The cushion material can comprise foamed resin which is polyurethane foam or the like. Another material can be also used for the cushion material. For the plate-like attachment base, polypropylene can be used. However, another rigid resin can be also used therefor.

According to the trim assembly, because the cushion member comprises the plate-like attachment base for securing the trim assembly to the body of the vehicle, and the cushion material fastened to the attachment base, it is possible to attach the trim assembly to the body of the vehicle by using the attachment base.

For the slippery layer, cloth made of nylon, span bond which is made of non-woven cloth, and the like can be used. Another span bond made of another material can be also used, and coated layer for slipping may be used for the slippery layer.

According to the trim assembly, because the slippery layer which makes the top cover easy to slip is formed on the surface of the cushion material, the top cover can be slippery against the cushion member. As the result, it is possible to keep the uniformly formed gathers on the top cover.

The plate-like attachment base may comprise a plurality of hooks for securing the trim assembly to the body of the vehicle, while a plurality of holes may be formed in the base member for the hooks to project through the holes so as to secure the trim assembly to the body. Each hook may comprise a shape like a "T", in cross section.

According to the trim assembly, because the plate-like attachment base comprises the plurality of hooks for securing the trim assembly to the body of the vehicle, and the plurality of holes are formed in the base member for the hooks to project through the holes so as to secure the trim assembly to the body, it is possible to easily attach the trim assembly to the body of the vehicle by using the attachment base. Further, because the hooks comprise a shape like the "T", in cross section, it can be possible to position the trim assembly to the body of the vehicle by easy operation.

In accordance with another aspect of the invention, a method for manufacturing a trim assembly for a vehicle, which has a tapered shaped front portion, upper and lower peripheral portions, which have approximately continuous smooth edge lines extending from the tapered shaped front portion toward a rear side in upper and lower sides, respectively, and a rear peripheral portion which connects rear ends of the upper and lower peripheral portions, and which comprises a top cover and a plate-like base member, wherein a gather-sewn peripheral portion of the top cover is sewn on a peripheral portion of the base member; the method comprises the steps of: forming each lower peripheral portion, of the top cover and the base member, the peripheral portions of which have been sewn to each other, an approximately straight shaped portion extending from the rear side to a portion near tapered shaped front portion, and being approximately in parallel with a rear of center of the upper peripheral portion, in a development state; inserting a cushion member between the base member and the top cover; turning back the lower peripheral portions, of the top cover and the base member onto the base member to make the approximately continuous smooth edge line extending from the tapered shaped front portion toward the rear side; and fastening the turned back lower peripheral portion, of the top cover and the base member to the base member.

In this case, the gather-sewing and the sewing are carried out by using a sewing machine.

The fastening can be carried out by tucking or stapling, for example. The fastening can be also carried out by bonding.

According to the method, because each lower peripheral portion, of the top cover and the base member, the peripheral portions of which have been sewn to each other is formed an approximately straight shaped portion extending from the rear side to a portion near tapered shaped front portion, and being approximately in parallel with a rear of center of the upper peripheral portion, in a development state, it is possible to form the gathers on the top cover in approximately parallel with each other.

The method can further comprise a step for previously forming a fold on the base member so that the fold comprises an approximately continuous smooth edge line extending from the tapered shaped front portion toward the rear side to make the lower peripheral portion of the base member easy to be turned back, together with the lower peripheral portion of the top cover sewn thereto.

According to the method, because the fold is previously formed on the base member so that the fold comprises an approximately continuous smooth edge line extending from the tapered shaped front portion toward the rear side to make the lower peripheral portion of the base member easy to be turned back, it is possible to easily turn back the lower peripheral portion of the base member, together with the lower peripheral portion of the top cover sewn thereto.

BREIF DESCRIPTION OF THE DRAWINGS

The above and other objects, features and advantages of the invention will become more apparent from the following description taken in conjunction with the accompanying drawings wherein like references refer to like parts and wherein:

FIGS. 1 and 1B show a member of the door lining assembly or trim panel assembly, for a vehicle according to an embodiment of the present invention; wherein FIG. 1B is a rear view of the bag-like member which is illustrated from the body side of the vehicle;

Figure 11:
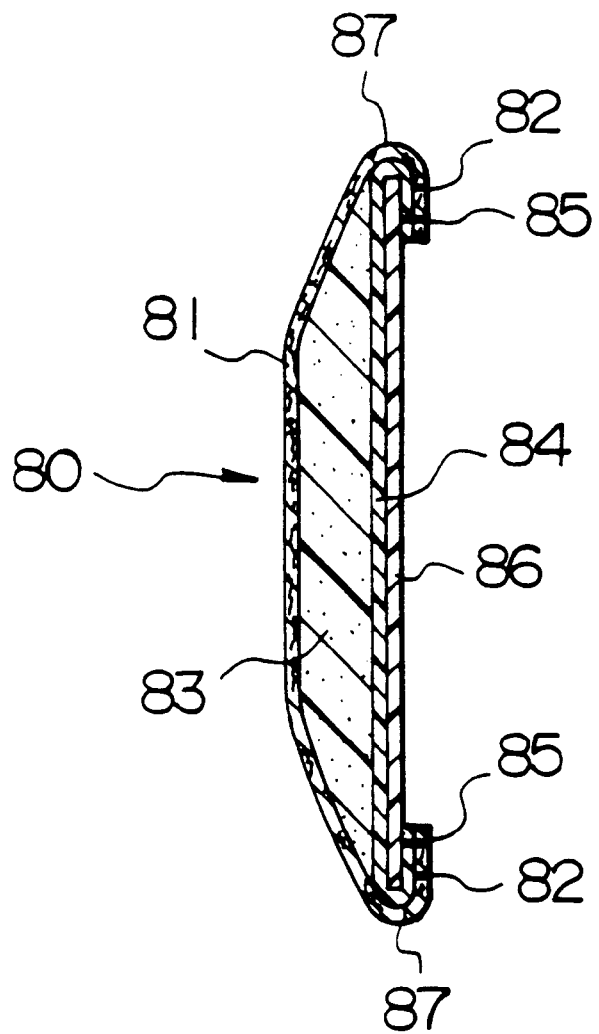
Figure 12A:
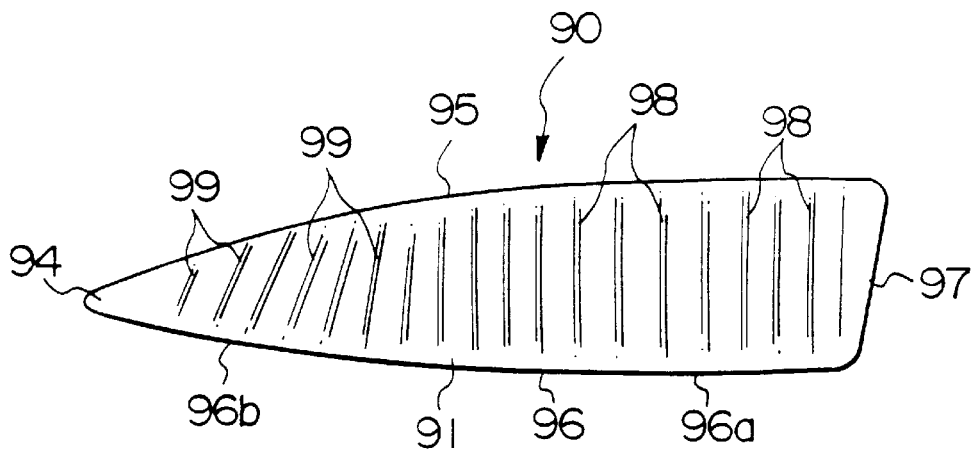
Figure 12B:
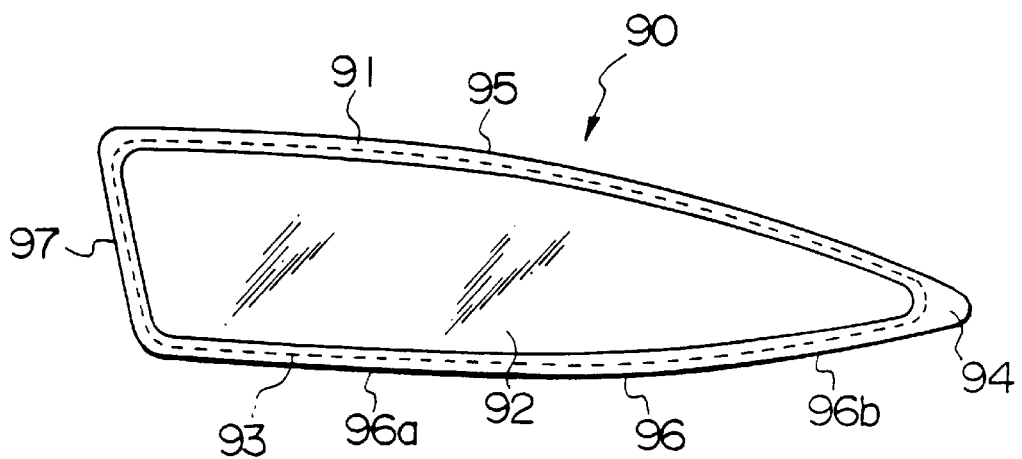
Figure 13A:
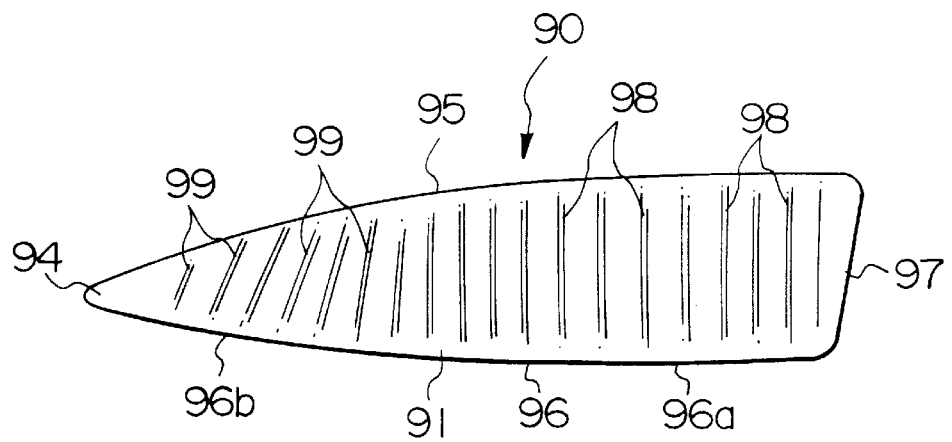
Figure 13B:
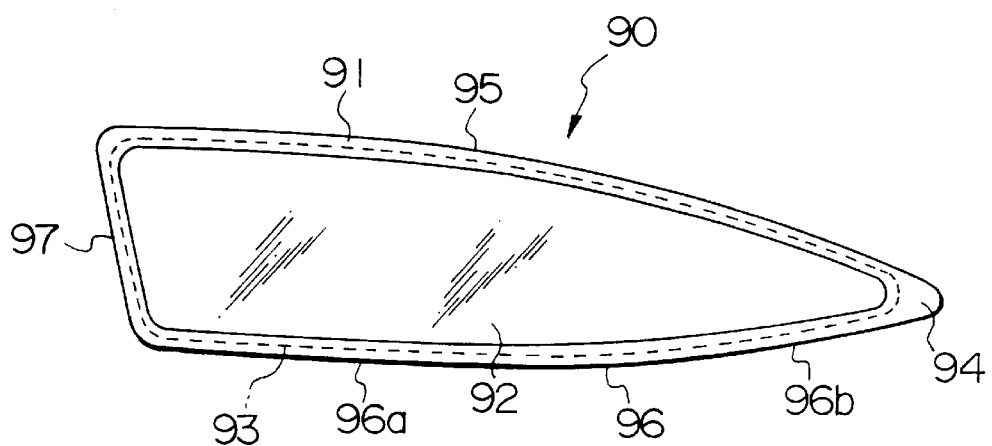

FIG. 11 is a vertical sectional view showing a trim assembly for a vehicle having a gathered top cover according to an earlier technology; and FIGS. 12A and 12B show a trim assembly for a vehicle having a gathered top cover according to an earlier technology: wherein FIG. 13A is a front view of the trim assembly which is illustrated from the room side of the vehicle; and FIG. 13B is a rear view of the trim assembly which is illustrated from the body side of the vehicle.

PREFFERED EMBODIMENT OF THE INVENTION

The embodiment of the trim assembly for a vehicle and the method manufacturing such a trim assembly, in accordance with the present invention will be explained with reference to FIGS. 1A to 11.

Figure 1A:
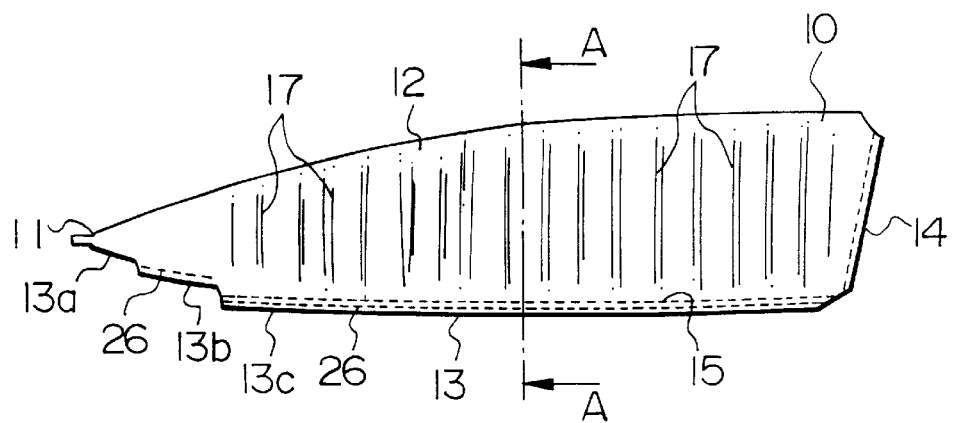
FIG. 1A is a front view of a bag-like member which is illustrated from the room side of the vehicle.
Figure 1B:
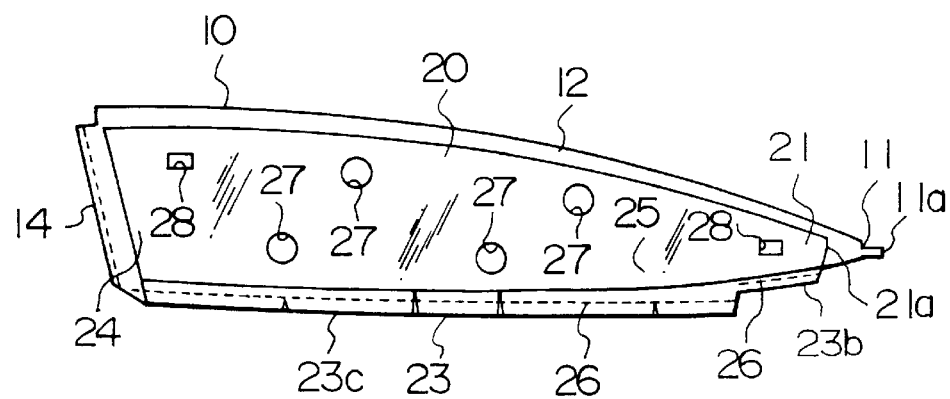
Figure 2:
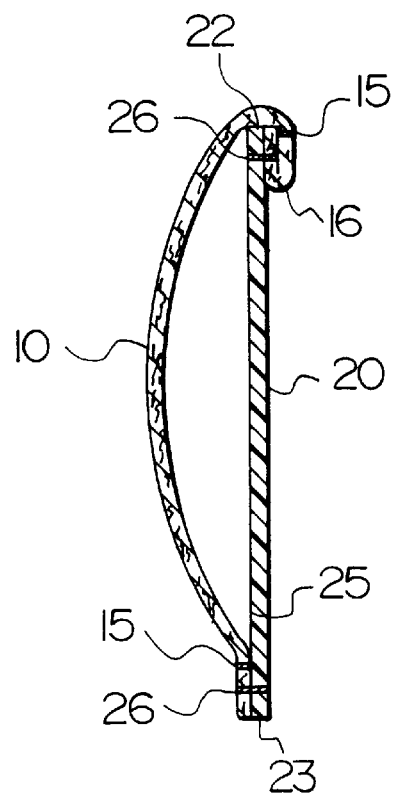
FIG. 2 is a cross-sectional view taken along the line A—A of FIG. 1A looking in the direction of the arrows.

FIGS. 1A and 1B show a member of the door lining assembly or the trim panel assembly, for a vehicle according to an embodiment of the present invention; wherein FIG. 1A is a front view of a bag-like member which is illustrated from the room side of the vehicle, and FIG. 1B is a rear view of the baglike member which is illustrated from the body side of the vehicle. FIG. 2 is a cross-sectional view taken along the line A—A of FIG. 1A looking in the direction of the arrows.

The trim assembly for a vehicle according to the embodiment comprises a top cover 10, a plate-like base member 20, and a cushion member inserted between them.

The top cover 10 is made of natural leather. The periphery of the top cover 10 comprises an upper peripheral portion 12 and a lower peripheral portion 13, which extend from a tapered front portion 11 toward the rear side in upper and lower sides, respectively, and a rear peripheral portion 14 which connects the rear ends of the upper and lower peripheral portions 12 and 13, as shown in FIGS. 1A and 1B. The upper peripheral portion 12 has an approximately continuous arc shaped edge line extending from the tapered front portion 11 to the rear end. The tapered front portion 11 comprises a small projecting portion 11a which projects in a front direction. The lower peripheral portion 13 comprises a first sloped peripheral portion 13a extending in the rear and a little lower direction from the tapered front portion 11, a second sloped peripheral portion 13b which goes down a step from the first sloped peripheral portion 13a and extends in the rear direction, and a straight shaped portion 13c having an approximately straight edge line, which goes down a step from the second sloped peripheral portion 13b and extends in the rear direction to connect a lower end of the rear peripheral portion 14, approximately in parallel with a rear of center of the upper peripheral portion 12, in a development state. The rear peripheral portion 14 connects to the rear ends, of the upper peripheral portion 12 and the approximately straight shaped portion 13c, respectively.

A gather-sewing is carried out on the top cover 10 along the upper peripheral portion 12 and the approximately straight shaped portion 13c, to form gather-sewn portions 15 shown in FIGS. 1A and 2. The edge of the straight shaped portion 13c is in approximately parallel with the edge of the rear of center of the upper peripheral portion 12.

The periphery of the cardboard or pasteboard 20 which is for a plate-like base member comprises an upper peripheral portion 22, a lower peripheral portion 23, and a rear peripheral portion 24. The upper peripheral portion 22 has an approximately continuous arc shaped edge line extending from a tapered front portion 21 to the rear end. The tapered front portion 21 comprises a straight shaped front end portion 21a. The lower peripheral portion 23 comprises a sloped peripheral portion 23b and a straight shaped portion 23c having an approximately straight edge line, which goes down a step from the sloped peripheral portion 23b and extends in the rear direction to connect a lower end of the rear peripheral portion 24, approximately in parallel with a rear of center of the upper peripheral portion 22, in the development state prior to turning back the lower peripheral portions of the top cover 10 and the base member 20, which will be explained later. The rear peripheral portion 24 connects to the rear ends, of the upper peripheral portion 22 and the approximately straight shaped portion 23c, respectively.

A fold 25 is formed in the cardboard or the pasteboard 20 to have an approximately continuous smooth edge line extending from the tapered front portion 21 to the lower end of the rear peripheral portion 24 along upper portions of the sloped peripheral portion 23b and the approximately straight shaped portion 23c which is approximately in parallel with the rear of center of the upper peripheral portion 22.

The upper peripheral portion 12 of the top cover 10 is overlapped and sewn on a body side surface of the upper peripheral portion 22 of the cardboard or the pasteboard 20, with truing up the upper edges of the top cover 10 and the base member 20, to form a sewn portion 26. Thereafter, the top cover 10 is turned over upwardly and further turned over beyond an upper edge of the base member so as to face a room side surface of the cardboard or the pasteboard 20 to form an upper turned over peripheral portion 16. Then, the approximately straight shaped portion 13c of the further turned top cover 10 is overlapped and sewn on the room side surface of the approximately straight shaped portion 23c of the cardboard or the pasteboard 20 together to form a sewn portion 26. The sloped peripheral portion 23b of the cardboard or the pasteboard 20 and the second sloped peripheral portion 13b of the top cover 10 are also sewn to form the sewn portion 26.

As the result, a bag-like member wherein the rear peripheral portions 14 and 24 are open is formed by the top cover 10 and the cardboard or the pasteboard 20. In this state, a large number of gathers 17 in lengthwise are formed on the top cover 10.

A large number of hole portions 27 and 28 are formed in the cardboard or the pasteboard 20.

Figure 3:
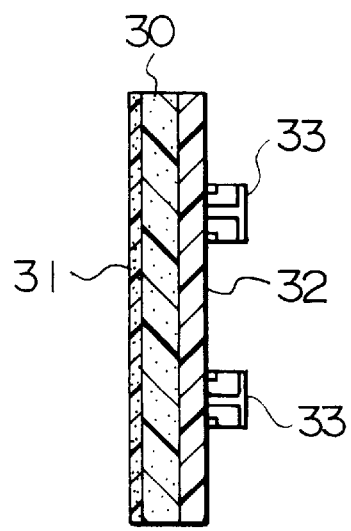
FIG. 3 is a vertical sectional view of an embodiment of the cushion member to be inserted into the bag-like member shown in FIGS. 1A and 1B.
Figure 6:
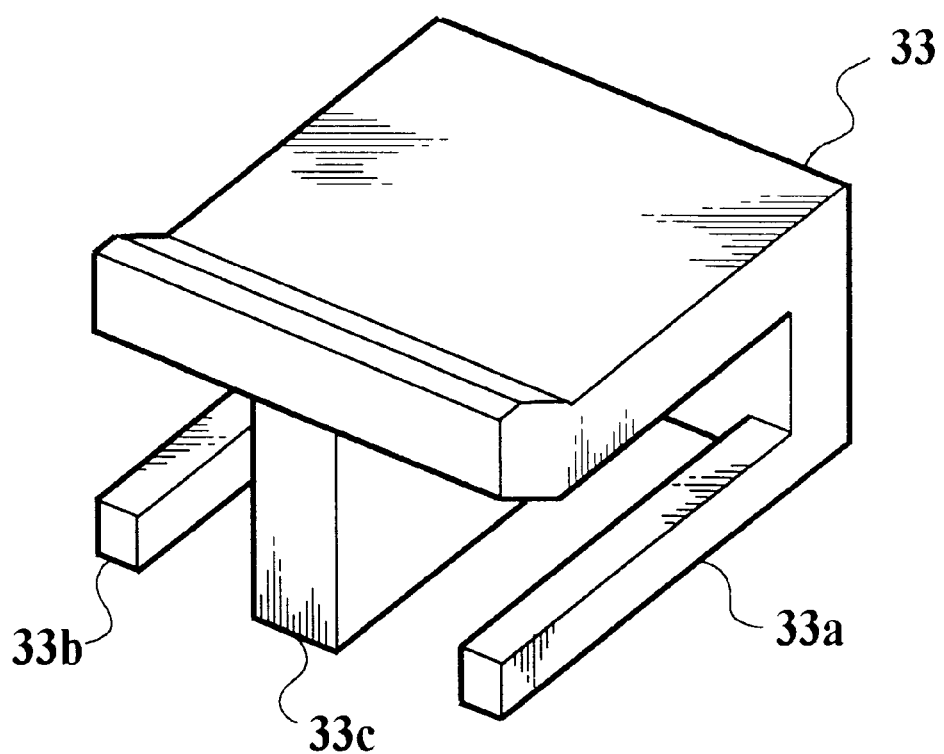
FIG. 6 is an enlarged detail of a hook of the door lining assembly or trim panel assembly, as shown in FIG. 3.

FIG. 3 shows a cushion member which is inserted into an inside of the bag-like member according to the embodiment. The cushion member comprises a cushion material 30, a slippery layer 31 formed on a surface of the cushion material 30, and a plate-like attachment base 32 for mounting the cushion material 30. The cushion material 30 comprises, for example, polyurethane foam which has a thickness of about 8 millimeters. On the surface of the cushion material 30, the slippery layer 31 as a surface layer, which comprises cloth made of nylon or the like or spun bond made of non-woven cloth is provided by bonding and the like. The cushion material 30 and a plate-like attachment base 32 which comprises rigid resin like polypropylene for example are made as a body by bonding or the like. A large number of hooks 33 are provided on a body side surface of the attachment base 32, as shown in FIG. 3. Each hooks 33 comprises a shape like a "T", in cross section, as shown in FIG. 6. The hooks have bars 33a and 33b in both right and left end sides thereof.

The cushion member which comprises the cushion material 30, the slippery layer 31 and the attachment base 32 has a shape suitable to be inserted into the inside of the bag-like member which is made of the top cover 10 and the cardboard or the pasteboard 20.

Figure 4:
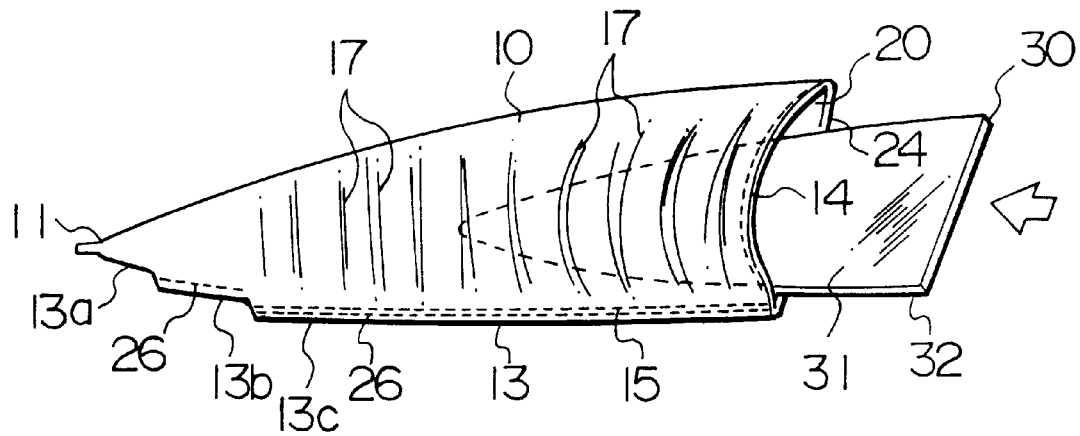
FIG. 4 is a perspective view showing a state of inserting the cushion member shown in FIG. 3 into the bag-like member.

The cushion member is inserted into the inside of the bag-like member from the opening portion at the rear peripheral portions 14 and 24, as shown in FIG. 4. Then, the hooks 33 on the body side surface of the attachment base 32 are projected through each hole portion 27 and 28 of the cardboard or the pasteboard 20.

Figure 5:
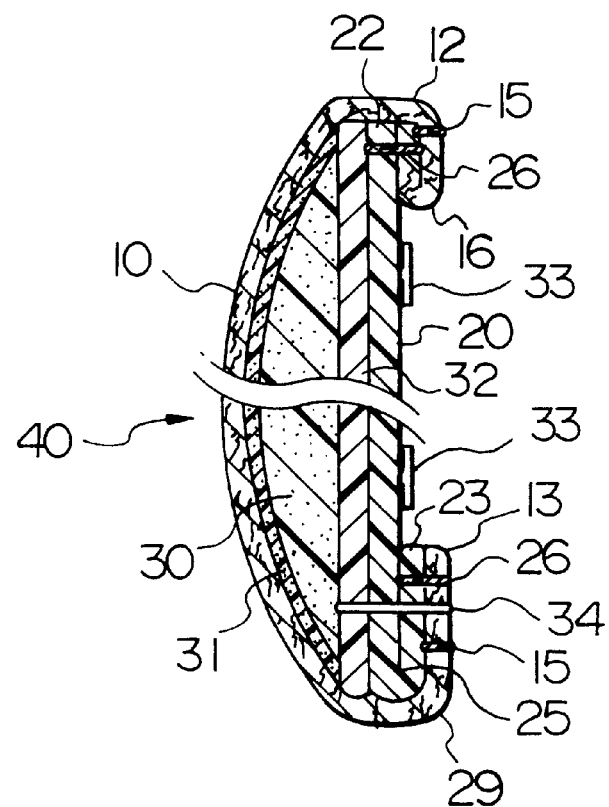
FIG. 5 is a vertical sectional view showing a completed state of the door lining assembly or trim panel assembly according to the embodiment.

The lower peripheral portion 13 of the top cover 10 and the lower peripheral portion 23 of the cardboard or the pasteboard 20 are turned back onto the body side surface of the cardboard or the pasteboard 20 to form a lower peripheral turned back portion 29, along the fold 25 which is formed in the cardboard or the pasteboard 20, thereafter the lower peripheral turned back portion 29 is fastened to the body side surface of the cardboard or the pasteboard 20 by tucking or stapling 34, as shown in FIG. 5. As the result, the lower peripheral portions 13 and 23 have the approximately continuous arc shaped edge line from the tapered front portions 11 and 21 to the lower end of the rear peripheral portions 14 and 24.

The rear peripheral portion 14 of the top cover 10 is also turned back onto the body side surface of the rear peripheral portion 24 of the cardboard or the pasteboard 20 and fastened thereto by tucking or stapling 34. The small projecting portion 11a of the tapered front portion 11 of the top cover 10 is also turned back onto a body side surface of the tapered front portion 21 of the cardboard or the pasteboard 20 and fastened thereto by tucking or stapling 34. As the result, a door lining assembly (pad) or a trim panel assembly (pad) 40 can be manufactured.

Figure 9:
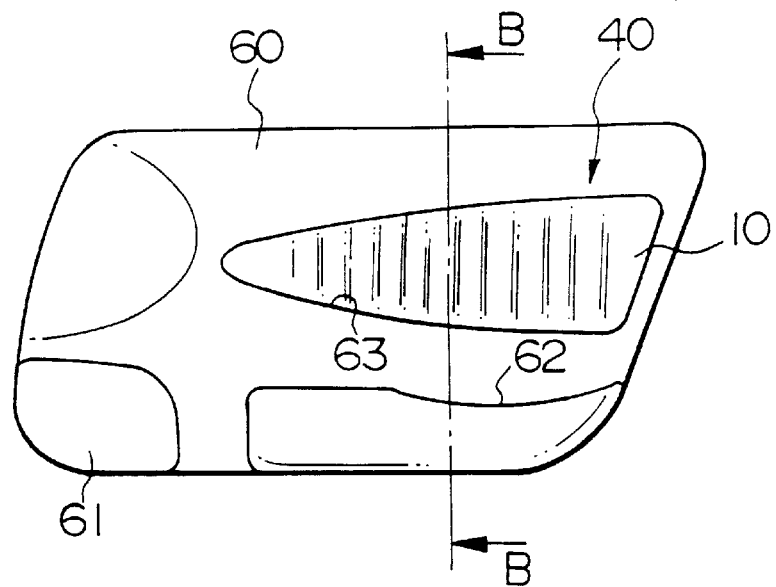
FIG. 9 is a schematic front view showing an embodiment of an attachment of the door lining assembly or trim panel assembly to the door lining or trim panel.
Figure 10:
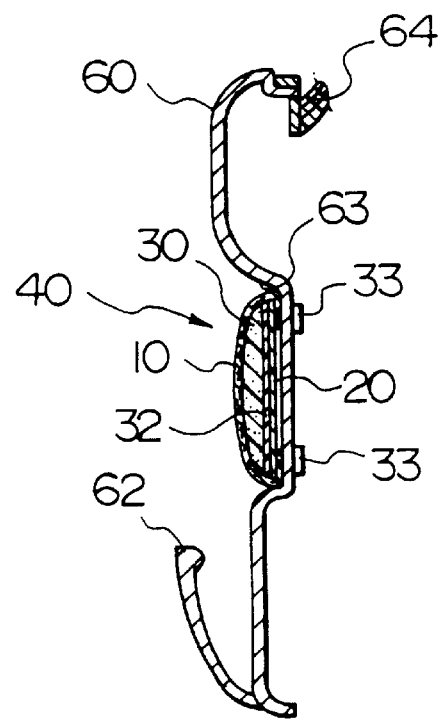
FIG. 10 is a cross-sectional view taken along the line B—B of FIG. 9 looking in the direction of the arrows.

The door lining assembly or the trim panel assembly 40 is attached to a door lining or a trim panel 60, as shown in FIGS. 9 and 10.

Figure 7:
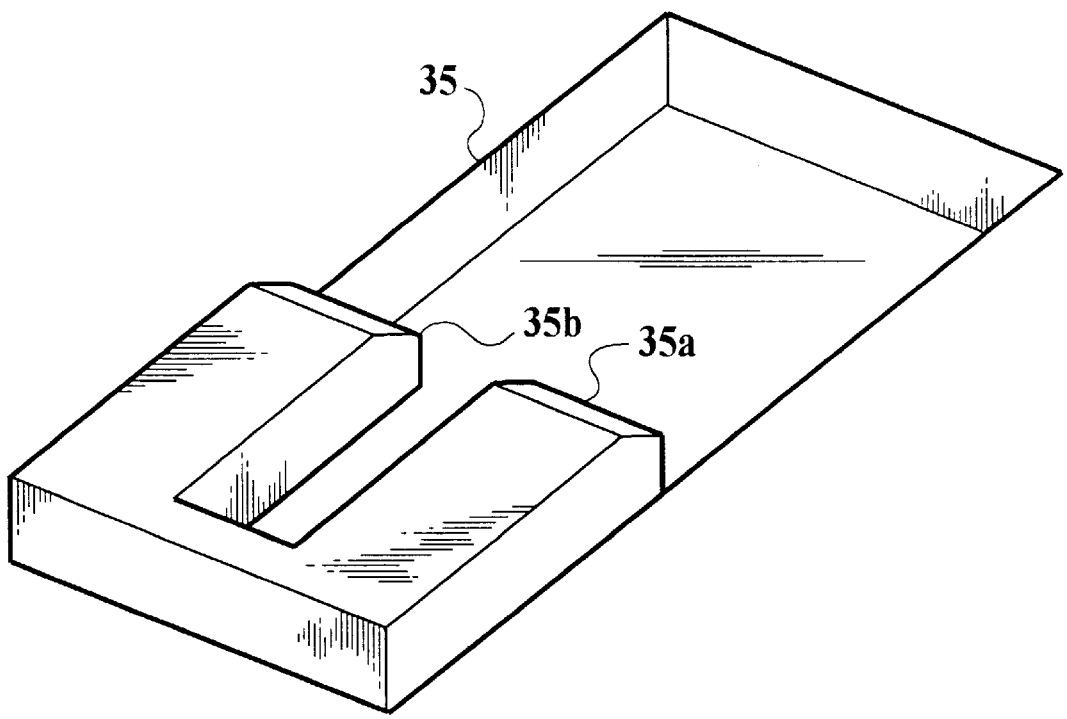
FIG. 7 is an enlarged detail of a slide hole portion of the door lining or trim panel, for attaching the hook.

The door lining or the trim panel 60 comprises a speaker 61 and an accessory pocket 62 on a lower portion thereof. An assembly attachment recess portion 63 is formed along an upper side of the accessory pocket 62. An inner shield or a whether strip 64 is provided to the door lining or the trim panel 60 along an upper peripheral portion of the door lining or the trim panel 60. A plurality of slide hole portions 35 are formed on the assembly attachment recess portion 63. Each slide hole portions 35 has a concave portion. That is, Each slide hole portions 35 has two convex portions 35a and 35b, as shown in FIG. 7.

Figure 8:
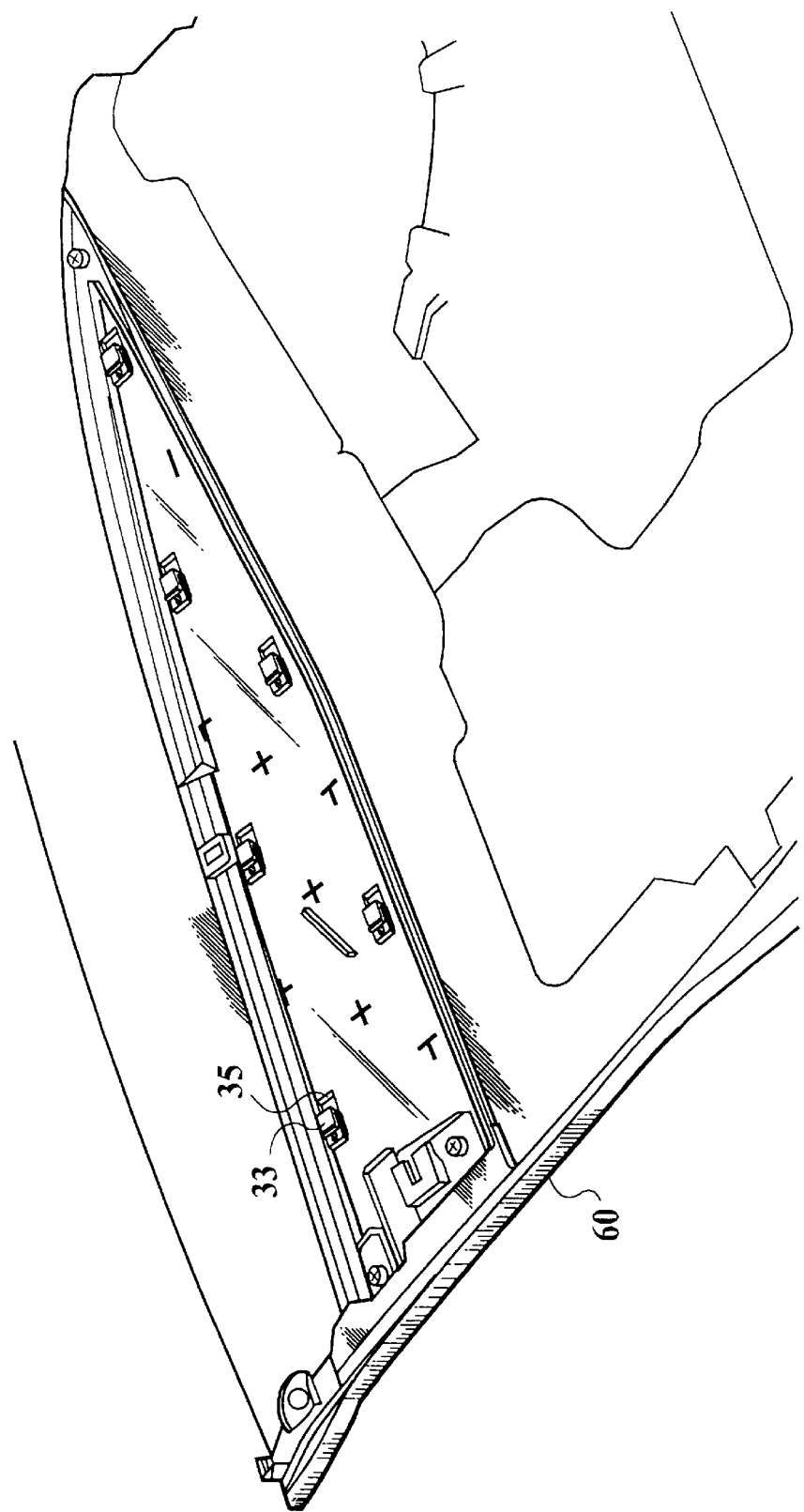
FIG. 8 is a partially rear view of the door lining or trim panel to which the door lining assembly or trim panel assembly according to the embodiment is attached.

FIG. 8 shows a partially rear view of the door lining or the trim panel 60 to which the door lining assembly or the trim panel assembly 40 is attached by the hooks 33 through the slide hole portions 35. The door lining assembly or the trim panel assembly 40 is fitted to the assembly attachment recess portion 63 of the door lining or the trim panel 60, so that the hooks 33 which project to a body side of the door lining assembly or the trim panel assembly 40 are projected into slide hole portions 35. When the door lining assembly or the trim panel assembly 40 is slid in the front or the rear direction, the convex portions 33c of the "T" of the hooks 33 are fitted in the concave portions of the slide hole portions 35. Then, the hooks 33 are secured to the door lining or the trim panel 60 by self-tapping screw or welding staking.

As described above, according to the door lining assembly or trim panel assembly 40 in the embodiment of the invention, in the top cover 10 and cardboard or pasteboard 20, in particular, because both of the lower peripheral portions 13 and 23 are formed to have approximately straight edges, in the development state to have the approximately straight shaped portions 13c and 23c extending from the rear side to the portion near tapered shaped front portion, and being approximately in parallel with the rear of center of the upper peripheral portions 12 and 22 which are apart from the tapered front portions 11 and 21 and connect to the rear peripheral portions 14 and 24, it is possible to form the lengthwise gathers 17 which are approximately in parallel with each other on the top cover 10 by gather-sewing the top cover 10 along the upper peripheral portion 12 and the approximately straight shaped portion 13c of the lower peripheral portion 13 to form the gather-sewn portion 15.

Therefore, it is possible to make the lengthwise gathers 17 stylish on the top cover 10, even though the door lining assembly or trim panel assembly 40 comprises the tapered front portions 11 and 21.

FIG. 11 shows a trim assembly (pad) having a gathered top cover according to an example of an earlier technology. Such an earlier door lining assembly (pad) or a trim panel assembly (pad) 80 for a door lining or a trim panel for a vehicle is manufactured by gather-sewing peripheral portions of a top cover 81 to form gather-sewn portions 82, sewing the peripheral portions of the top cover 81 to form sewn portions 85 on peripheral portions of one-piece cardboard or pasteboard 84 to a room side surface to which polyurethane foam 83 for a cushion member is fastened, turning back both of the peripheral portions, of the top cover 81 and the cardboard or pasteboard 84 to form turned back portions 87 so as to wrap the peripheral portions of a resin attachment base 86, and subsequently bonding both of the turned peripheral portions, of the top cover 81 and the cardboard or pasteboard 84 to a body side surface of the resin attachment base 86.

It is obvious that the method of the present invention can be applied to the earlier door lining assembly (pad) or a trim panel assembly (pad) 80.

According to the embodiment as described above, the top cover comprises the natural leather. However, it is not limited to this, for example, artificial leather, cloth made of fibers, or the like can be also used for the top cover.

The materials of the base member, the cushion material, the attachment base, and the surface layer of the cushion member are not also limited to that in the embodiment.

As described above, according to the trim assembly, because each lower peripheral portion, of the top cover and the base member, the peripheral portions of which have been sewn to each other comprises an approximately straight shaped portion extending from the rear side to the portion near tapered shaped front portion, and being approximately in parallel with the rear of center of the upper peripheral portion, in the development state, it is possible to form the gathers in approximately parallel with each other.

Therefore, it is possible to make the lengthwise gathers stylish on the top cover, even though the door lining assembly or trim panel assembly comprises the tapered shaped front portion.

According to the trim assembly, because the cushion member comprises the plate-like attachment base for securing the trim assembly to the body of the vehicle, it is possible to further obtain a benefit that the trim assembly can be attached to a door panel of the vehicle by using the attachment base.

According to the trim assembly, because the slippery layer which makes the top cover easy to slip is formed on the surface of the cushion material, the top cover can be slippery against the cushion member. As the result, it is possible to further obtain a benefit that it is possible to keep the uniformly formed gathers on the top cover.

According to the trim assembly, because the plate-like attachment base comprises the plurality of hooks for securing the trim assembly to the body of the vehicle, and the plurality of holes is formed in the base member for the hooks to project through the holes so as to secure the trim assembly to the body, it is possible to easily attach the trim assembly to the body of the vehicle by using the attachment base. Further, because the hooks comprise a shape like the "T", in cross section, it is possible to position the trim assembly to the body of the vehicle by easy operation.

According to the method, because each lower peripheral portion, of the top cover and the base member, the peripheral portions of which have been sewn to each other is formed approximately straight shaped portion extending from the rear side to the portion near tapered shaped front portion, and being approximately in parallel with the rear of center of the upper peripheral portion, in the development state, it is possible to form the gathers in approximately parallel with each other.

Therefore, it is possible to make the lengthwise gathers stylish on the top cover, even though the door lining assembly or trim panel assembly comprises the tapered shaped front portion.

According to the method, because the fold is previously formed on the base member so that the fold comprises the approximately continuous smooth edge line extending from the tapered shaped front portion toward the rear side to make the lower peripheral portion of the base member easy to be turned back, it is possible to easily turn back the lower peripheral portion of the base member, together with the lower peripheral portion of the top cover sewn there to.

Obviously, many modifications and variations of the present invention in light of the above teaching may be made. It is, therefore, to be understood that, within the scope of the appended claims, the invention may be practiced otherwise than as specifically described.

The entire disclosure of Japanese Patent Application No. 10-149978 filed on May 29, 1998 including specification, claims, drawings and summary are incorporated herein by reference in its entirety.

What is claimed is:

1. A trim assembly for a vehicle, having a tapered front portion, upper and lower peripheral portions, with continuous edge lines extending from the tapered front portion which separate from each other toward a rear side, and a rear peripheral portion connecting the upper and lower peripheral portions, the trim assembly for a vehicle comprising:

a top cover having a gather-sewn peripheral portion having, when the trim assembly is unfolded, a lower edge having a stairs-like shape having a first oblique portion, a second oblique portion and an approximately straight portion, the first oblique portion extending obliquely from a tapered shaped front portion toward a lower and rear side, the second oblique portion making a stair to the first oblique portion toward a lower side and extending obliquely toward the lower and rear side, the approximately straight portion making a stair to the second oblique portion toward the lower side and extending toward a rear side to reach a lower end of a rear peripheral portion, the approximately straight portion approximately paralleling a rear side portion of an upper peripheral portion having an edge line extending from the tapered shaped front portion toward the rear side;

a plate-like base member having a lower edge having, when the trim assembly is unfolded, a stair-like shape having an oblique portion and an approximately straight portion the oblique portion extending obliquely from a tapered shaped front portion toward a lower and rear side, the approximately straight portion making a stair to the oblique portion toward a lower side and extending toward a rear side to reach a lower end of the rear peripheral portion, the approximately straight portion approximately paralleling a rear side portion of an upper peripheral portion having an edge line extending from the tapered shaped front portion toward the rear side, the gather-sewn peripheral portion of the top cover and a peripheral portion of the plate-like base member being sewn together; and a cushion member inserted between the plate-like base member and the top cover wherein the trim assembly for a vehicle has a structure such that when the lower edges of the top cover and the plate-like base member are turned back onto and fastened to the plate-like base member, the lower edges form a continuous edge line extending from the tapered shaped front portion toward the rear side.

2. A trim assembly for a vehicle as claimed in claim 1, wherein the approximately continuous smooth edge line has an approximate arc shape.

3. A trim assembly for a vehicle as claimed in claim 1, wherein each lower peripheral portion of the top cover and the base member in the development state comprises a sloped peripheral portion provided near the tapered shaped front portion, and the approximately straight shaped portion which goes down a step from the sloped peripheral portion to extend toward the rear side.

4. A trim assembly for a vehicle as claimed in claim 1, wherein the lower peripheral portions of the top cover and the base member in the development state are turned back onto and fastened to a body side surface of the base member to make the approximately continuous smooth edge line.

5. A trim assembly for a vehicle as claimed in claim 1, wherein the cushion member comprises a plate-like attachment base for securing the trim assembly to a body of the vehicle, and a cushion material fastened to the attachment base.

6. A trim assembly for a vehicle as claimed in claim 1, wherein the cushion member comprises a cushion material, and a slippery layer which makes the top cover easy to slip on a surface of the cushion material.

7. A trim assembly for a vehicle as claimed in claim 5, wherein the cushion member further comprises a slippery layer which makes the top cover easy to slip on a surface of the cushion material.

8. A trim assembly for a vehicle as claimed in claim 5, wherein the plate-like attachment base comprises a plurality of hooks for securing the trim assembly to the body of the vehicle.

9. A trim assembly for a vehicle as claimed in claim 8, wherein each hook comprises a shape like a "T", in cross section.

10. A trim assembly for a vehicle as claimed in claim 9, wherein a plurality of holes are formed in the base member for the hooks to project through the holes so as to secure the trim assembly to the body.

11. A method for manufacturing a trim assembly for a vehicle, the trim assembly having an external shape having a tapered shaped front portion, upper and lower peripheral portions, having continuous edge lines extending from the tapered shaped front portion which separate from each other toward a rear side and a rear peripheral portion connecting rear ends of the upper and lower peripheral portions, a top cover having a gather-sewn peripheral portion and a plate-like base member, the gather-sewn peripheral portion of the top cover being sewn on a peripheral portion of the plate-like base member, the method comprising the steps of:

forming a lower edge of the top cover into a stairs-like shape having a first oblique portion, a second oblique portion and an approximately straight portion, the first oblique portion extending obliquely from a tapered shaped front portion toward a lower and rear side, the second oblique portion making a stair to the first oblique portion toward a lower side and obliquely toward the lower and rear side, the approximately straight portion making a stair to the second oblique portion toward the lower side and extending toward a rear side to reach a lower end of a rear peripheral portion, the approximately straight portion approximately paralleling a rear side portion of an upper peripheral portion having an edge line extending from the tapered shaped front portion toward the rear side, the upper peripheral portion of the top cover being sewn to the plate-like base member;

forming a lower edge of the plate-like base member into a stair-like shape having an oblique portion and an approximately straight portion, the oblique portion extending obliquely from a tapered shaped front portion toward a lower and rear side, the approximately straight portion making a stair to the oblique portion toward a lower side and extending toward a rear side to reach a lower end of a rear peripheral portion, the approximately straight portion approximately paralleling a rear side portion of an upper peripheral portion having a continuous edge line extending from the tapered shaped front portion toward the rear side; sewing the top cover and the plate-like base member together along the approximately straight portions;

inserting a cushion member between the plate-like base member and the top cover;

turning back the lower edges of the top cover and the plate-like base member onto the plate-like base member to make the continuous edge line extending from the tapered shaped front portion toward the rear side; and fastening the turned back lower edges of the top cover and the plate-like base member to the plate-like base member.

12. A method as claimed in claim 11, further comprising a step for previously forming a fold on the base member so that the fold comprises an approximately continuous smooth edge line extending from the tapered shaped front portion toward the rear side to make the lower peripheral portion of the base member easy to be turned back, together with the lower peripheral portion of the top cover sewn thereto.

13. A trim assembly for a vehicle, having a triangle-like shape when the trim assembly is completed, the trim assembly comprising:

a top cover having a first and second adjacent sides and a third side being adjacent thereto, the first side extending from a top toward the third side with separating from the second side to reach one end of the third side, the first and second sides contacting with each other at the top, the second side having, when the trim assembly is unfolded, a stairs-like shape having a first oblique portion extending obliquely from the top in a direction separating from the first side, the stairs-like shape having a second oblique portion making a stair to the first oblique portion in the direction separating from the first side, the second oblique portion extending obliquely toward the third side and in the direction separating from the first side, the stairs-like shape having an approximately straight portion making a stair to the second oblique portion in the direction separating from the first side, the approximately straight portion contacting the other end of the third side and approximately paralleling a part of the first side from a center to the third side, the top cover having a periphery being gather-sewn; a plate-like base member having a shape having at least first and second sides and a third side being adjacent thereto, the first side extending from one end of the third side in a direction approaching to the second side, the second side having, when the trim assembly for a vehicle is unfolded, a stair-like shape having an approximately straight portion extending from the other end of the third side and approximately paralleling a part of the first side from a center to the third side, the stair-like shape having an oblique portion making a stair to the approximate approximately straight portion in the direction approaching to the first side, the oblique portion extending in the direction approaching to the first side, the plate-like base member having a periphery being sewn to the periphery of the top cover; and a cushion member inserted between the plate-like base member and the top cover wherein the trim assembly for a vehicle has a structure that edges of the second sides of the top cover and plate-like base member are turned back together onto and fastened to the plate-like base member to make a smooth edge line extending from the top toward the third side.

* * * * *